(12) United States Patent
Hornby

(10) Patent No.: US 7,773,456 B2
(45) Date of Patent: Aug. 10, 2010

(54) SYSTEM AND METHOD FOR SEISMIC DATA ACQUISITION

(75) Inventor: Brian E. Hornby, Katy, TX (US)

(73) Assignee: BP Corporation North America Inc., Warrenville, IL (US)

( * ) Notice: Subject to any disclaimer, the term of this patent is extended or adjusted under 35 U.S.C. 154(b) by 80 days.

(21) Appl. No.: 11/866,265

(22) Filed: Oct. 2, 2007

(65) Prior Publication Data

US 2008/0080308 A1 Apr. 3, 2008

Related U.S. Application Data

(60) Provisional application No. 60/848,848, filed on Oct. 2, 2006.

(51) Int. Cl.
*G01V 1/00* (2006.01)
(52) U.S. Cl. .......................... 367/73; 367/38
(58) Field of Classification Search .................. 367/38, 367/56, 57
See application file for complete search history.

(56) References Cited

U.S. PATENT DOCUMENTS

| | | | | |
|---|---|---|---|---|
| 4,057,780 | A * | 11/1977 | Shuck ........................ | 367/86 |
| 4,214,226 | A * | 7/1980 | Narasimhan et al. .......... | 367/27 |
| 5,191,557 | A * | 3/1993 | Rector et al. ................... | 367/41 |
| 5,742,560 | A * | 4/1998 | Krebs ........................ | 367/57 |
| 6,339,333 | B1 | 1/2002 | Kuo | |
| 6,694,263 | B2 | 2/2004 | Fournier et al. | |
| 6,715,551 | B2 | 4/2004 | Curtis et al. | |
| 6,747,915 | B2 * | 6/2004 | Calvert ........................ | 367/46 |
| 6,751,555 | B2 | 6/2004 | Poedjono | |
| 6,757,217 | B2 | 6/2004 | Eastwood et al. | |
| 6,757,615 | B2 | 6/2004 | Zauderer et al. | |
| 6,763,304 | B2 | 7/2004 | Schonewille | |
| 6,775,618 | B1 | 8/2004 | Robertston et al. | |
| 6,778,918 | B2 | 8/2004 | Delhomme et al. | |
| 6,801,858 | B2 | 10/2004 | Nivlet et al. | |
| 6,823,265 | B2 | 11/2004 | Haldorsen | |

(Continued)

FOREIGN PATENT DOCUMENTS

WO 02075363 A1 9/2002

OTHER PUBLICATIONS

Vscape Well Calibrated Seismic "Completing the Borehole Seismic Puzzle", Vsfusion and CGG, Aug. 2004.*

(Continued)

*Primary Examiner*—Jack Keith
*Assistant Examiner*—Krystine Breier
(74) *Attorney, Agent, or Firm*—Albert K. Shung

(57) ABSTRACT

There is provided herein a system and method for the imaging and monitoring of hydrocarbon reservoirs and other subsurface features preferably using seabed or surface sensors in conjunction with one or more downhole sensors. In one preferred embodiment, recordings will be simultaneously made using both seabed and downhole receivers. The energy source might be either a controlled seismic source or ambient noise. In one embodiment, the data will be used to compute a virtual VSP, checkshot, or similar survey by cross correlating a trace recorded at the surface with a trace recorded at depth. In another embodiment, the surface and well sensors will be permanently emplaced and repeated recordings over time will be used to form a time-varying (4-D) image of the subsurface.

7 Claims, 4 Drawing Sheets

U.S. PATENT DOCUMENTS

| | | | |
|---|---|---|---|
| 6,826,483 | B1 | 11/2004 | Anderson et al. |
| 6,829,570 | B1 | 12/2004 | Thambynayagam et al. |
| 6,906,982 | B2 | 6/2005 | Calvert |
| 6,917,564 | B2* | 7/2005 | Leaney .................. 367/73 |
| 7,046,581 | B2 | 5/2006 | Calvert |
| 2004/0076077 | A1 | 4/2004 | Robertson et al. |
| 2004/0100865 | A1 | 5/2004 | Tenghamm |
| 2004/0136266 | A1 | 7/2004 | Howlid et al. |
| 2005/0117452 | A1 | 6/2005 | Calvert |
| 2006/0009911 | A1* | 1/2006 | Burkholder et al. .......... 702/18 |
| 2007/0195643 | A1* | 8/2007 | Bakulin et al. .............. 367/38 |

OTHER PUBLICATIONS

Schneider, "The Common Depth Point Stack", Proceedings of the IEEE, vol. 72, No. 10, Oct. 1984, pp. 1238-1254.*

Artman, Brad, "A return to passive seismic imaging," Jun. 9, 2002, pp. 361-369, Publisher: Stanford Exploration Project, Report 111, Published in: US.

Brewer, Robert J., VSP data in comparison to other borehole seismic data, Feb. 2000, Published in: US.

Duey, Rhonda, "Virtually There," Jul. 2006, Publisher: www.EandPnet.com, Published in US.

Hauge, Paul, S., "Measurement of attenuation from Vertical Seismic Profile," Nov. 1981, pp. 1548-1558, vol. 46, No. 11, PUblisher: Geophysics, Published in US.

Hornby, et al., VSP: Beyond time-to-depth, Apr. 2006, pp. 446-452, Publisher: The Leading Edge, Published in: US.

Lewkowicz, et al., "Short Note: Results from operating open-hole and cased-hole vertical seismic profiles,"Dec. 1984, pp. 2186-2189, vol. 49, No. 12, Publisher: Geophysics, Published in: US.

Lokbis, et al., "On the emergence of the green's function in the correlations of a diffuse field," Dec. 2001, Publisher: J Accoust. Soc. Am., Published in: US.

Mehta, Kurang, et al., "Virtual source gathers and attenuation of free-surface multiples using OBC data: Implementation issues and a case study", 2006, Published: US.

MTNET Archival Information Page, Jun. 12, 2006, Published in: US.

"Partial Derivatives", Jun. 12, 2006; Publisher: http://seismic.snu.ac.kr/-sheen/swi/swi3.html, Published in: US.

Pratt, R. Gerhard, et al., "Gauss-Newton and full Newton methods in frequency-space seismic waveform inversion," 1998, pp. 341-362, No. 133, Publisher: Ras, GJL, Published in: US.

Pratt, R. Gerard, "Seismic waveform inversion in the frequency domain, Part 1: Theory and verification in a physical scale model," 1999, pp. 888-901, vol. 4, No. 3, Publisher: Geophysics, Published in: US.

Rickett, James and Claerbout, Jon, "Passive seismic imaging applied to synthetic data," Nov. 12, 1997, pp. 87-91, Publisher: Stanford Exploration Project, Report 92, Published in: US.

Rickett, James et al., "Acoustic daylight imaging via spectral factorization: Helioseismology and reservoir monitoring," Aug. 1999, pp. 957-960, Publisher: the Leading Edge, Published in: US.

Schneider, Wiliam A., et al., "Dynamic Correlation Analysis," Feb. 1968, pp. 105-126, vol. 33, No. 1, Publisher: Geophysics, Published in: US.

Schuster, Gerard T., "Reverse Time Migration=Generalized Diffraction Stack Migrtion," Apr. 2, 2001, Published in: US.

Schuster, Gerard T., "A theoretical Overview Among Model-Based and Correlation-Based Redaturning Methods," 2006, Publisher: Geophysics, Published in: US.

Schuster, Gerard T., "Theory of Daylight/Interferometric Imaging: Tutorial", 2001, PUblisher: 63rd Annual Meeting of European Associations of Geophysicists, Published in: US.

2005 Seismic Interferometry Abstracts, 2005, Published in: US.

Hornby, Brian et al., "Single-Well imaging of a salt flank using walkaway VSP data," 2006, published in: US.

Stekl, et al., "Accurate viscoelastic modeling by frequency-domain finite differences using rotated operators," 1998, pp. 1779-1994, vol. 63, No. 5, Publisher: Geophysics, Published in: US.

Wapenaar, Kees, et al., "Seismic Inventory, Time-Reversal and Reciprocity," Jun. 16, 2005, Publisher: EAGE 67th Conference, Madrid, Spain, Published in: Spain.

Wapenaar, Kees, et al., "Seismic interferometry: a comparison of approaches," 2004, Publisher: 74th SEG Annual Meeting, Denver, Published in: US.

Yu, Jianhua et al., "Crosscorrelogram migration of inverse vertical seismic profile data," Feb. 2006, pp. S1-S11. vol. 71, No. 1, PUblisher: Geophysics, Piblished in U.S.

* cited by examiner

SYSTEM AND METHOD FOR SEISMIC DATA ACQUISITION

RELATED CASES

This application claims the benefit of U.S. Provisional Patent Application Ser. No. 60/848,848 filed on Oct. 2, 2006, and incorporates said provisional application by reference into this disclosure as if fully set out at this point.

TECHNICAL FIELD

This invention relates to the general subject of geophysical exploration for hydrocarbons and, in particular, to methods for collecting and analyzing seismic data in which at least one seismic receiver is positioned beneath the earth's surface.

BACKGROUND OF THE INVENTION

A seismic survey represents an attempt to image or map the subsurface of the earth by sending energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth, is reflected, and, upon its return, is recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey.

A conventional seismic survey is composed of a very large number of individual seismic recordings or traces. In a typical 2-D survey, there will usually be several tens of thousands of traces, whereas in a 3-D survey the number of individual traces may run into the multiple millions of traces. Chapter 1, pages 9-89, of *Seismic Data Processing* by Ozdogan Yilmaz, Society of Exploration Geophysicists, 1987, contains general information relating to conventional 2-D processing and that disclosure is incorporated herein by reference. General background information pertaining to 3-D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 millisecond and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface.

Many variations of the conventional source-receiver arrangement are used in practice, e.g. VSP (vertical seismic profile) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

Of particular interest for purposes of the instant application are seismic exploration techniques such as VSPs or similar technology. By way of general background, a VSP survey is an exploration technique in which a seismic signal is generated at or near the surface and subsequently sensed by one or more geophones (land seismic sensors) or hydrophones (marine seismic sensors) that are situated in the subsurface, e.g., within a cased or uncased well which may or may not have been drilled for that purpose. VSP surveys have traditionally been used to create 1-D reflectivity maps and measure the travel-times to each geophone and their derivative, the near-borehole velocity field. VSP (and checkshot, see below) travel times are commonly used to calibrate surface seismic data to well depth via the explicit time-to-depth relationship measured by the well data. The near-borehole velocity field can be used for purposes such as updating the surface seismic velocity field, used for imaging, or used for pore pressure estimation via a transform. VSPs are also commonly used for offset surveys used for subsurface imaging. VSP imaging surveys may be 3-D (e.g., wherein a 2-D grid of surface source positions is utilized) and 2-D VSP (or walkaway VSP) which utilize a 1-D line of surface source positions along with the VSP array in the borehole.

VSP seismic data are often used to support and clarify the subsurface interpretation obtained from other seismic data sources (e.g., conventional surface seismic, well logs, cores, etc.). Because the VSP receivers are situated in the subsurface they potentially yield unique information about the up going and down going seismic energy and, since they are located much nearer to the subsurface target(s) of interest (and, in more particular, are located below the surface weathering layer) than surface receivers, there is an expectation that the data collected thereby will be yield a more representative image of the subsurface.

Related in general concept to the VSP survey is a checkshot survey, which also utilizes a surface source and downhole receivers (e.g., seismic receivers that are positioned within a producing well, a well that is being drilled, a well that was created for purposes of seismic imaging, etc.). However, the checkshot survey is directed not so much toward imaging the subsurface, but rather toward development of time-depth pairs for depth tying of surface seismic images to well data. In addition, checkshots can be used to create a velocity profile of the rocks near the well. One difference between a VSP survey and a checkshot survey is that in a checkshot survey attention is typically directed only toward the first breaks (earliest arrivals) of the seismic energy from the source, whereas in a VSP survey it is the seismic energy that is sensed following the first break that is most useful for purposes of seismic imaging. Of course, those of ordinary skill in the art will understand that a VSP survey also yields a checkshot survey, but not vice versa. Finally, the various methods of collecting and processing VSP and checkshot data to make them useful in seismic exploration are well known to those of ordinary skill in the art and, as such, will not be covered herein.

For all of the subsurface information that might be acquired via a VSP or other seismic survey, there are still geologic configurations that are not well imaged by these and other seismic techniques. As a specific example, obtaining accurate images of a salt dome flank in the Gulf of Mexico or elsewhere is a well known challenge. However, drilling wells based on imperfect or incomplete information about the location of the edge of salt risks an enormous financial loss if the well is mispositioned.

Heretofore, as is well known in the geophysical prospecting and interpretation arts, there has been a need for a method of using seismic data to obtain images of the subsurface that does not suffer from the limitations of the prior art. Accordingly, it should now be recognized, as was recognized by the present inventors, that there exists, and has existed for some time, a very real need for a method of geophysical prospecting that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred aspect of the instant invention, there is provided herein a system and method for the imaging and monitoring of hydrocarbon reservoirs and other subsurface features preferably using surface (e.g., seabed sensors) in conjunction with one or more downhole sensors.

In one preferred embodiment, a real-time checkshot or similar 1-D survey is obtained by simultaneously recording at least one downhole receiver and one or more surface (e.g., seabed) receivers that are situated near the well that contains the downhole sensing device. The energy source for the survey might be a conventional or unconventional controlled seismic source (e.g., an airgun, or other onshore or offshore seismic source) or ambient noise (e.g., rig noise, drilling noise, etc.). The resulting data records will preferably thereafter be used to compute a real-time checkshot, VSP or similar survey according to methods discussed hereinafter. In some arrangements, the recording process will be repeated periodically over some period of time in order to monitor the changing character of a reservoir that is being produced (e.g., a time-lapse checkshot or 1-D VSP survey will be produced), preferably by observing variations in time-to-death curves that have been calculated from the recorded data. In this variation, it would be beneficial to have the surface and downhole receivers permanently installed so that the time-separated measurements would be directly comparable with each other.

The combination of surface and subsurface receivers described previously will be used to create so-called "virtual sources" at the surface receivers by combining surface and downhole receiver records. Either impulsive sources or ambient/random surface noise could be used. In one preferred variation, in order to improve the coverage provided by a passive survey, dedicated passive noise generators, for example purposefully placed buoys powered by wave-motion, could be utilized to augment the noise that would otherwise be observed.

In a preferred arrangement, virtual checkshot records will be produced by cross correlating (or similarly combining) the surface and subsurface receivers. In brief, the instant method will preferably operate by selecting a downhole receiver, cross correlating the signal received by that receiver with one or more surface-recorded traces, and summing together (or otherwise combining) the cross correlations produced thereby. The resulting composite trace will be comparable to a trace that was obtained by activating a source that is located on the same plane as that of the surface (or seabed) receivers and positioned such that the arrival time at the geophone is equal to the minimum travel-time path that would be followed by energy from a source located in the plane of the surface (or seabed) receivers. For a 1-D (layer cake) subsurface model, this would be equivalent to a source located vertically above the downhole receiver, or at the center of the surface (or seabed) located receivers provided those receivers are centered above the selected downhole receiver. Preferably, the recievers—both surface and subsurface—will be permanently or semi-permanently installed.

It should be noted that a preferred virtual checkshot/VSP survey using rig noise in combination with one or more downhole receivers and a group of surface recievers according to the instant invention yields a virtual source at the seabed at location that is determined by the positioning of the recievers and the local earth structure. Such a (1-D) survey would not normally be used for imaging purposes, but rather it would be used, for example, to monitor compaction over time. Due to the large volume of passive data that would typically be generated by this approach, it would preferably be processed in the field using automatic methods.

One way in which this embodiment typically differs from the 1-D/checkshot case discussed previously is that the virtual source calculation in this embodiment is different in that it does not require integration over surface receiver position. Additionally, the preferred seismic source for the instant embodiment will be preferably be an active one, e.g., either a conventional impulsive source or a manufactured random source such as two buoys knocking together.

According to the instant embodiment, it will be possible to obtain multiple time-lapse or "4-D" images, each such individual image being a 3-D snapshot of a subsurface environment that is potentially undergoing dynamic change. In other cases, a 1-D or 2-D time-lapse survey might be conducted, depending on the placement of the receivers and how the data are acquired and processed. Of course the advantages of collecting such time-lapse surveys are well known and, as a specific example of how they might be used, such surveys are used to estimate changes in compaction, interval velocity, or other subsurface changes that might be brought when hydrocarbons are removed from the subsurface. As another preferred use, a 4-D or other time-lapse survey might be used to continuously monitor the progression of a drill bit through the subsurface, which information would be of special importance if there were a concern that high-pressure gas could potentially be encountered by the bit. Of course, the source for each subsurface snapshot might either be active or passive according to the wishes of the designer.

Note that where a 2-D array of surface receivers is utilized, the approach discussed above will yield a corresponding 2-D set of virtual sources/source locations which, in turn, will yield data that potentially provides a 3-D image of the subsurface. Further, and as is described in greater detail hereinafter, the method of processing data obtained via the instant embodiment is different from that used in the 1-D/checkshot survey case presented previously.

The conceptual similarity between the traces obtained via the methods disclosed above and those obtained from a standard VSP or checkshot survey should be clear. Thus, data that are obtained in this fashion may be utilized for any purpose that a conventional VSP trace or checkshot trace might be utilized. For example, having obtained seismic data traces according to the methods disclosed herein, the information contained therein could be used to estimate the velocities between the surface and the downhole receivers (e.g., as in a checkshot survey). Further, the resulting virtual source traces could also be used for imaging purposes as is traditionally done with VSP survey data. As another preferred use, by utilizing surface receivers that are distributed in a 2-D pattern about the well bore, a 3-D data set can be collected which is analogous to that obtainable from a 3-D VSP survey.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which.

DETAILED DESCRIPTION

Figure 1:
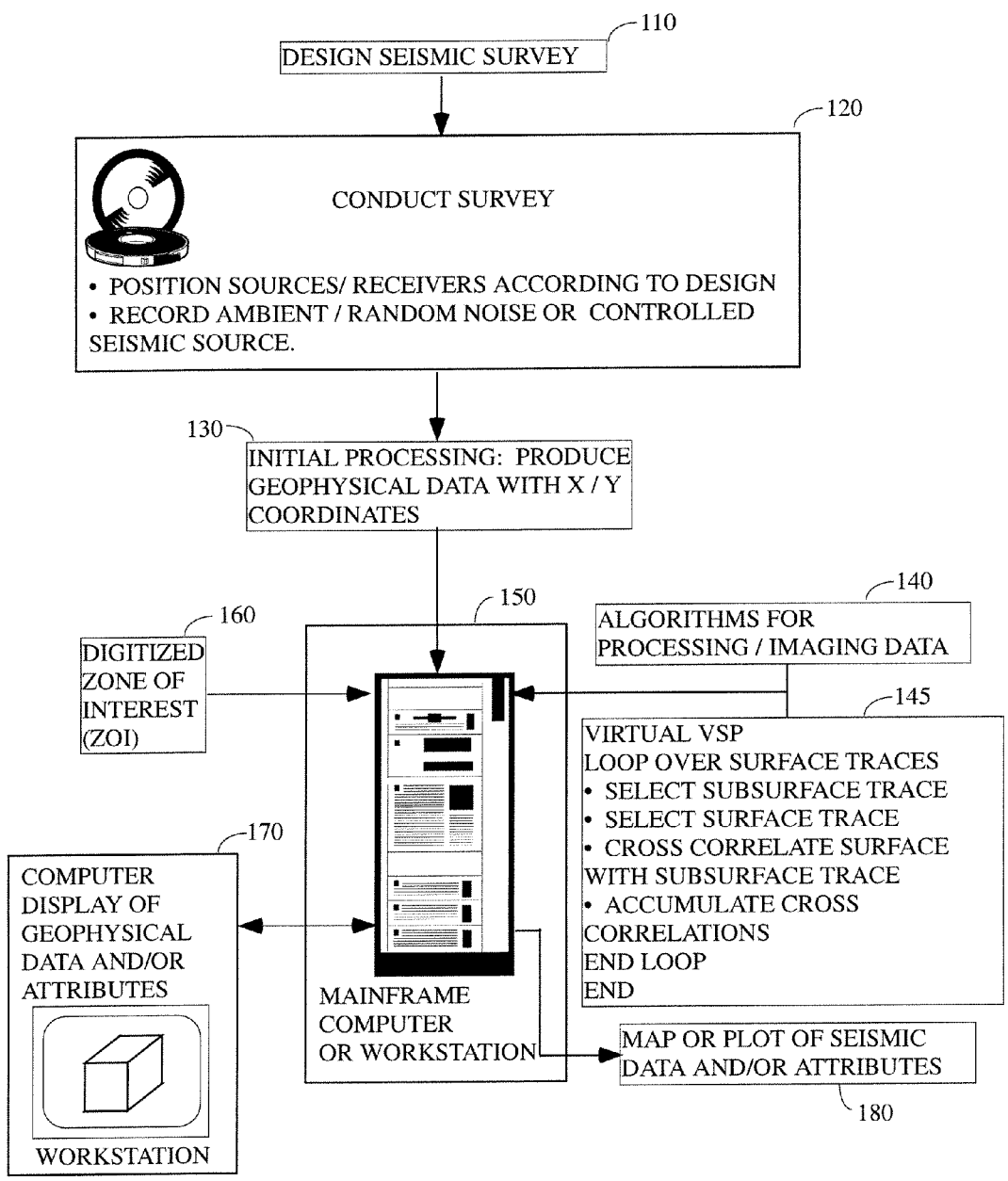
FIG. 1 illustrates the general environment of the instant invention

While this invention is susceptible of being embodied in many different forms, there is shown in the drawings, and will herein be described, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 1 illustrates the general environment in which the instant invention would typically be used. As a first step, a seismic survey will be designed (step 110), wherein the survey geometry, sample rate, number of sources/receivers, etc. would typically be selected in order to image a preferred subsurface target. Among the many parameters that might be considered in formulating the survey design are:

the surface area to be covered by the survey;
whether the survey will be conducted on land, offshore, or some combination of the two environments;
the depth of the target;
the 3D structure of the target (including its 2D or 3D dip, if any);
whether the design will utilize an "end on" configuration (wherein all of the active receivers are on the same side of the source) or a "split spread" configuration (i.e., wherein active receivers are placed both ahead of and behind of the source);
the maximum offset (i.e., in the case where an active source is used the distance from the source to the most distant active receiver) and minimum offset (i.e., the distance from the source to the closest active receiver);
the receiver-to-receiver spacing;
the source-point spacing if a controlled source is used (i.e., the shot-to-shot spacing, where "shot" is used in the sense of "source activation point");
the relation between source-points and receiver-points (e.g., sources near to receivers, sources midway between receivers, etc.);
the frequencies expected in the received data;
the strength of the sources, and the sensitivity of the receivers, etc.

Of course, the selection of parameters such as the foregoing are design choices that are well within capability of one of ordinary skill in the art. Further, those of ordinary skill in the art will recognize that many of the previous parameters are interrelated (e.g., specification of the target depth determines in a general way a preferred maximum offset, etc.).

Next, equipment (including geophones and/or hydrophones or other seismic receivers, as well as recording instruments, etc.) will be typically moved to and set up in the field at least approximately according to the planned survey design 110. Next, and as is described more fully below, a survey will be conducted 120 that is preferably at least approximately in accordance with the original design. Of course, it is certainly possible that on-site changes will need to be made to the survey as-designed. However, generally speaking the goal of the field crew is to replicate the parameters of the original survey parameter specifications as closely as is possible.

Additionally, it should be noted that preferably the receivers will be divided between surface (preferably sea-bottom) receivers and one or more downhole receivers. Methods for emplacing either temporarily or permanently sea bottom and downhole receivers are well known to those of ordinary skill in the art and will not be discussed further here.

After positioning the source and receivers, the data will preferably be collected conventionally depending on the sort of survey that is being taken. For example, if an active survey is conducted each source activation might be accompanied by 8 seconds or so of recording at a 2 ms sample interval, with the exact length of each recording and sample rate being depending on a number of factors well known to those of ordinary skill in the art. On the other hand, if the survey is a passive one, the recording will preferably be continuous or nearly so, with the data possibly broken up into convenient individual records, the length of which typically may be 30 s or more.

As is typical in controlled source seismic surveys, the source will be activated and the resulting seismic signals sensed by the receivers and converted to electrical energy which is subsequently digitized and recorded. The response of each receiver to the source will preferably be captured digitally as a function of time and stored on magnetic or other media for transportation to a centralized computing facility where the data will be processed, interpreted, and integrated into other data taken over the same prospect. That being said, in some instances some amount of initial processing 130 will be applied to the data while it is in the field. For example, such in-field processing might be done in order to verify the quality of the data that are being collected. In other instances, the data might be processed to see whether or not the target subsurface rock units are being imaged adequately. In any case, after field processing the data will usually at least be relatable to specific locations on the surface of the earth.

In a passive source survey, a similar procedure takes place although there is no controlled activation of the source. Instead, the sources of seismic energy occur naturally at random times and at much lower amplitude than a conventional controlled source. This may help explain while longer recording periods are more often used when passive source data is collected.

Although the data that are collected according to the instant invention may be processed to some extent in the field (step 130), eventually it will typically be transferred to a processing center where more computing resources 150 and algorithms 140 are available. The methods of the instant invention (e.g., computer algorithm 145) will preferably be implemented in a processing center or other facility suitable for processing seismic data. In the processing center a variety of processes 140 might be applied to the data to make them ready for use by the explorationist. At some point the processed data traces will likely be stored, by way of example only, on hard disk, magnetic tape, magneto-optical disk, DVD disk, or other mass storage means.

Note that a general purpose computer 150 would typically include, in addition to mainframes and workstations, computers and networks of computers that provide for parallel and massively parallel computations, wherein the computational load is distributed between two or more processors. As is also indicated in FIG. 1, in some preferred embodiments a digitized zone of interest model 160 would be specified by the user and provided as input to the processing computer program. In the case of a 3D geophysical data, the zone of interest 160 would typically include specifics as to the lateral extent and thickness (which might be variable and could be measured in time, depth, frequency, etc.) of a subsurface interval. The exact means by which such zones are created, picked, digitized, stored, and later read during program execution is unimportant to the instant invention and those skilled in the art will recognize that this might be done any number of ways.

The algorithms that are used to process the seismic data might be conveyed into the computer 150 by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a network.

After the seismic data has been subjected to the processes discussed herein, the resulting information will likely be displayed either on a high-resolution color computer monitor 170 or in hard-copy form as a printed section or a map 180. The geophysical interpreter would then use the displayed images to assist him or her in identifying subsurface features conducive to the generation, migration, or accumulation of hydrocarbons.

Preferred Embodiments

According to a preferred aspect of the instant invention, there is provided a system and method for imaging the subsurface which utilizes a combination of surface receivers and receivers situated in the subsurface to create "virtual source" traces that provide unique information about the subsurface. For purposes of the instant invention, the term "virtual source" should be understood to mean a seismic trace that has been created from two (or more, in some cases) simultaneously recorded seismic traces by cross correlation or a similar procedure, such that the resulting signal content is conceptually the same as the content that would have been observed if a shot had been detonated at one receiver and recorded at the other. Note that the source(s) that is recorded can be arbitrarily situated with respect to the two receivers. Further, the source that is utilized might be either active or passive, depending on the design goals.

By way of general background, whether the source is controlled or passive, the instant invention is generally based on the theory that follows. Let $A(\omega)$ be the response recorded at a seabed or other surface sensor, let $B(\omega)$ be the response recorded at an in-well sensor, which is preferably permanently installed. Let $N(\omega)$ be a controlled or uncontrolled (e.g., rig noise) signal source, let $c(\omega)$ be the receiver response function, and $\hat{G}(A,B,\omega)$ be the desired Green's function (i.e., impulse response) between the seabed sensor A and the downhole sensor B.

For a single seabed receiver located just above the downhole receiver and just below the signal source (e.g., if the survey geometry is approximately 1-D so that the seabed sensor is essentially directly above the receiver array, FIG. 4), it follows that:

$$A(\omega)=c(\omega)N(\omega)$$

$$B(\omega)=c(\omega)N(\omega)\hat{G}(A,B,\omega),$$

so that the Green's function $G(A,B,\omega)$ between A and B is simply recovered via a deconvolution-like process:

$$\hat{G}(A,B,\omega)=B(\omega)/A(\omega).$$

Those of ordinary skill in the art will recognize that in some instances the previous formulation cannot be literally applied (e.g., because of holes or near-holes in the spectrum of $A(\omega)$) and well known means for modifying it for computational purposes are readily available in those instances. As a specific example of how this formulation could be modified, consider the following well known approach which bounds the denominator away from zero by using a value that is related to the peak value of the power spectrum of $A(\omega)$:

$$\hat{G}(A, B, \omega) \cong \frac{B(\omega)A^*(\omega)}{\max[A(\omega)A^*(\omega), cK]},$$

where K is the peak value of the power spectrum $A(\omega)A^*(\omega)$. A value for c of about 1% generally yields satisfactory results. Note that if c=1, the previous expression reduces to:

$$\hat{G}(A, B, \omega) \cong \frac{B(\omega)A^*(\omega)}{K}$$

which is the frequency domain representation of the scaled cross-spectrum of the responses recorded at A and B. Those of ordinary skill in the art will recognize that the cross correlation between two time series can also be described as the convolution of one time series with the time reverse of the other. Thus, when the term "cross correlation" is used herein, that language should be understood to also include time-reversed convolution and similar mathematical operations that produces results that are mathematically equal (or similar) to cross correlation.

Note that a similar result to the foregoing was obtained previously by Claerbout who demonstrated in 1968 that the autocorrelation of the response of a surface sensor to random noise yields the reflectivity responses of the earth. Later, Claerbout conjectured that by cross correlating noise traces that have been recorded at two locations on the surface, the wavefield that would be recorded at one of the locations if a source was activated at the other may be estimated. However, no one has heretofore utilized a combination of surface and subsurface receivers to create virtual source data.

Figure 4:
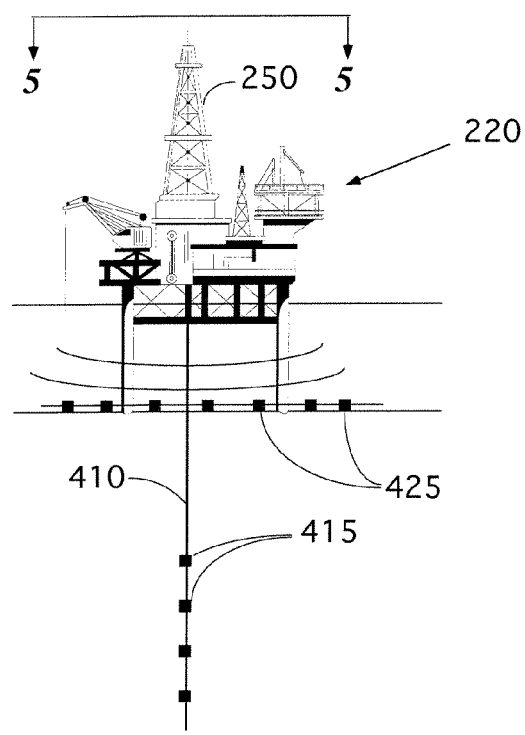
FIG. 4 illustrates a preferred configuration of the instant invention suitable for use with a well that is approximately vertical.

As is generally indicated in FIG. 4, in a first preferred arrangement, seismic receivers (e.g., hydrophones) 425 will be positioned on the sea floor proximate to a well 410 or other subsurface-penetrating feature. If the well 410 is offshore, there will likely be a platform 420 nearby which can serve as location from which to collect data from both the in-well 415 and sea floor 425 receivers. Those of ordinary skill in the art will recognize that many alternative locations for the recording electronics are possible and have been specifically contemplated by the instant inventor. For example, if telemetry is utilized the recording instrumentation could be placed anywhere within signal range.

The receivers 415 and 425 will preferably be recorded without the step of activating a source, i.e., a passive seismic survey will be conducted. In such a case, the interrogating seismic signal will be largely generated by uncontrolled surface sources such as rig noise, ship propellers, storms, on-shore quarry blasts, nearby off shore marine surveys not intended for reception by the receivers 415 and 425 (which in other contexts would be a nuisance, here contribute to the passive signal), etc., and/or subsurface sources such as earthquakes, drill bit noise, etc. Passive sources will likely be most applicable to the scenario of FIG. 4, and this is especially so wherein the well is at least approximately vertical. In such a case, the downhole 415 and surface 425 receivers would nearly be in vertical alignment which would be simplify the processing and likely improve the resulting data quality.

For purposes of the instant embodiment, it should be noted that it is unlikely that the noise source, surface sensor, and downhole receiver will all be perfectly alligned. In that case it is possible to reconstruct the VSP response that would have been observed from an idealized surface source located on the surface directly above the downhole receiver using stationary phase principles well known to those of ordinary skill in the art.

The following computation provides an estimate of the impulse response, $\hat{G}(\hat{A},B,t)$ (Green's function), between an idealized source $\hat{A}$ located at the surface location giving the minimum travel-time between a seabed (surface) source and a downhole receiver that has recorded signal B(t):

$$\hat{G}(\hat{A}, B, t) \cong \sum_{i=1}^{N} C_i(A_i, B, t),$$

where, there are N surface source positions, where $A_i(t)$ is the signal recorded by seabed/surface receiver i, and $C_i(A_i,B,t)$ is the cross-correlation function.

Note that the previous equation will sum constructively where the change in signal with increasing source offset tends to 0 (e.g., stationary phase). The resulting quantity $\hat{G}(\hat{A},B,t)$ is the vertical seabed source to downhole receiver response. In the preferred arrangement, the previous computation is repeated for each downhole receiver which results resulting in an array of 1-D VSP-like data that has been recorded continuously with time.

Other variations of the previous embodiment are certainly possible including, for example, instances where impulsive (e.g., traditional seismic sources such as air guns, etc.) are utilized. However, a central goal of the instant embodiment is to use surface noise data recorded on seabed and downhole sensors to computer an equivalent seabed (or surface in the case of a land application) source-downhole receiver geometry.

Figure 2:
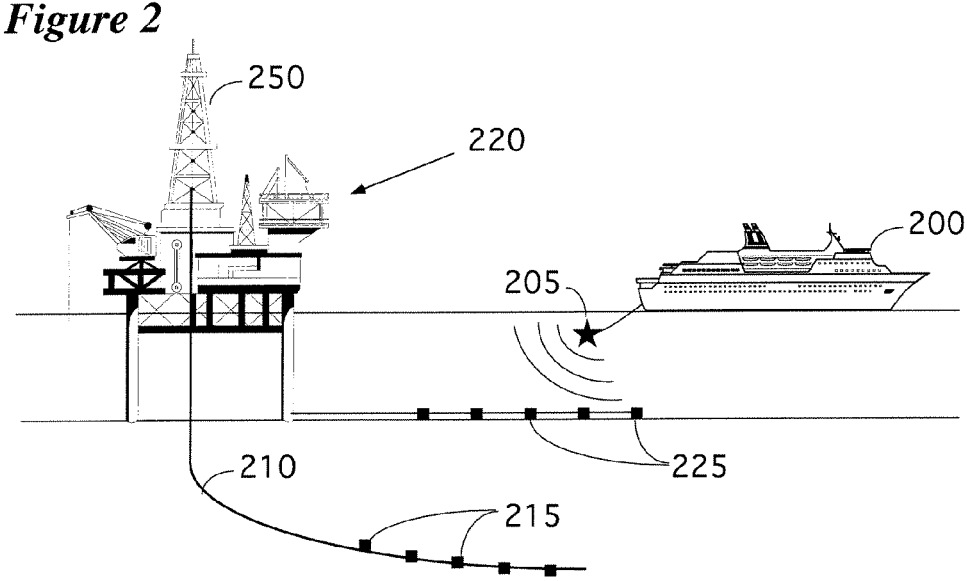
FIG. 2 illustrates a typical configuration involving surface and subsurface receivers, wherein the well is deviated.

Turning now to another preferred embodiment of the instant invention, and as is indicated generally in FIG. 2, preferably a permanent seabed array in connection with one or more downhole receivers will be used to compute virtual sources at each receiver position of the permanent seabed array. In the preferred arrangement of FIG. 2, a source 205 (e.g., an airgun) will be towed in the vicinity of the receivers 215 and 225 and activated at or proximate to predetermined shot locations. The seismic source 205 will generate energy waves that travel (in this case) through the water before reaching the sea floor, thereafter passing into the subsurface. As the energy passes through the subsurface, a portion of it will be reflected at each discontinuity (e.g., layer boundary) that it encounters along the way, the reflected energy propagating back toward the surface where it will potentially be sensed by the surface receivers 225. Obviously, once the downward energy passes the in-well receivers 215 some part of the upward reflected energy will also potentially be sensed by those receivers.

The use of permanently emplaced sensors is an arrangement that is especially preferred where repeated measurements at the same location are contemplated, for example where a continuous (or periodically repeated) survey is to be conducted for purposes of monitoring changing subsurface conditions during drilling or well production. In the case of a marine data acquisition, having the sea bottom receivers at permanent locations will tend to eliminate variables such as sea level changes, sea temperature changes (and their associated velocity changes), etc., thereby largely eliminating the effect of these and other potential noise sources from the survey results. Of course, given the low amplitude sources that typically form the basis for a passive survey, it is preferred that variables that are known to adversely effect survey-to-survey signal quality should be controlled to the extent possible.

In the case of a dedicated source vessel (e.g., FIG. 2), the coverage should certainly be adequate. One of the main advantages of re-datuming the surface sources to the seabed as compared with a traditional marine survey is to obtain improved signal characteristics, and this is especially so in a time-lapse or 4-D survey. So, one potential impact of this process with dedicated surface source vessels it to improve the repeatability and accuracy of the 4-D VSP imaging responses obtained thereby.

As compared with the previous embodiment, integration of each seabed receiver position is not required. The expectation is that there will typically be broad enough source coverage (either from impulsive sources fired from a surface source or random/manufactured surface noise) such that virtual sources can be recovered from the surface receivers. However, the preferred embodiment does include a summation over shot (or, e.g., recording interval). Said another way, as is indicated in the equation below where there are multiple instances of a signal recorded by the same surface/subsurface receiver pair, it is reasonable to combine those into a single trace (i.e., single cross correlation) in order to improve the signal-to-noise ratio as is conventionally done with standard seismic data.

More specifically, the preferred procedure in this case is to estimate the virtual source at each seabed receiver is as follows:

$$\hat{G}(A, B, t) \cong \sum_{i=1}^{M} C_i(A, B, t),$$

where A(t) is a signal that has been recorded via one of the surface/seabed receivers, B(t) is a downhole receiver, and the summation is over source (i=1,M), e.g., all surface source firings are integrated into a single virtual source. Alternatively, where passive sources are used, the successive "shots" will preferably be different recorded time intervals through the same surface/subsurface pair. This procedure is preferably repeated for all surface and downhole receiver positions. The resulting data traces are essentially a 3-D survey equivalent to sources at the seabed at the permanent receiver locations which have been shot into the downhole permanent seismic sensors.

In the case where random surface noise is used to compute virtual sources at the seabed, the procedure is similar. However, the previous summation expression simplifies as follows:

$$\hat{G}(A,B,t) \cong C(A,B,t)$$

where signals are measured at uphole receiver A and downhole receiver B over sufficiently long periods of time such that the range of noise signals from different surface locations are included in the signal (e.g., noise from different surface production facilities, ships, storms, etc.). In practice, however, it is unlikely that there will be sufficient coverage and strength from passive energy sources along to yield a usable 3-D survey.

Figure 7:
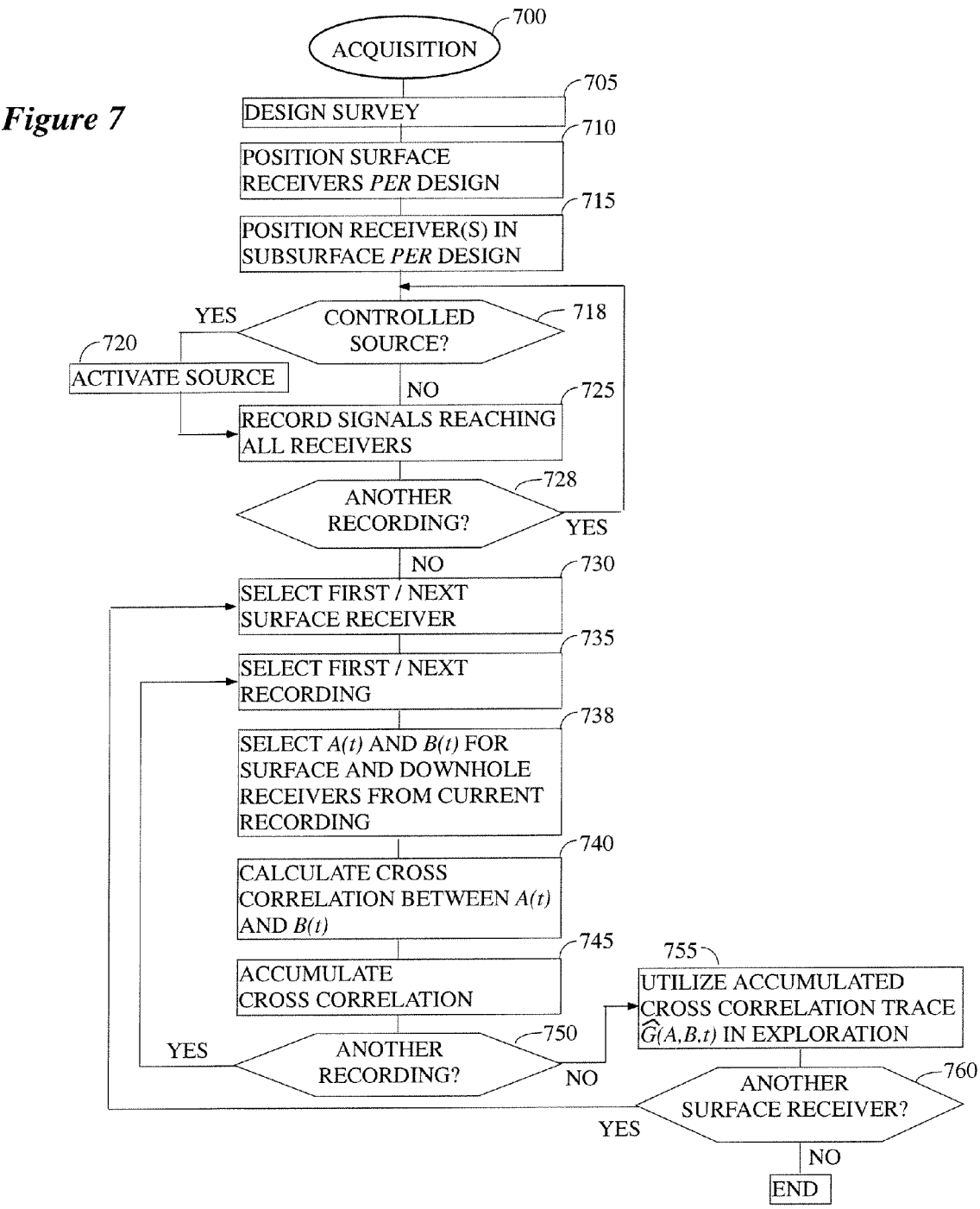
FIG. 7 illustrates a preferred operating logic for use with another embodiment of the instant invention.

FIG. 7 provides additional information related to the instant method. As is generally indicated, the instant method 700 begins with the design 705, positioning (705 and 710), and data acquisition (718, 720, 725, and 728) of a seismic survey that contains both surface and subsurface recording sensors. As has been discussed previously, the step of recording (step 725) might include capturing a single excitation of an impulsive source, or a recorded time interval (e.g., continuously recording for multiple seconds, minutes, hours, or even days, etc., during the excitation of numerous natural/random sources). Note that each recording (step 725) has been assumed, for purposes of simplicity, to include signals from all of the surface sensors as well as all of the downhole sensors.

After one or more recordings have been obtained, a next preferred step is to select a first or next surface receiver location (step 730). Note that, for purposes of illustration only, it will be assumed that there is a single downhole receiver. That being said, those of ordinary skill in the art will easily recognize how the steps of FIG. 7 might be modified to include additional downhole receivers.

As a next preferred step, a first or next recording will be selected (step 735) from those previously obtained at step 725. From this recording, the seismic traces corresponding to the selected surface location and the downhole receiver will be selected (step 738), i.e., A(t) and B(t). Next, the cross correlation will preferably be calculated between A(t) and B(t) (step 740). The calculated cross correlation for this receiver pair will then preferably be accumulated (step 745) (e.g., averaged, summed, a median taken, etc.). If there are additional recordings (logic test 750), they will preferably be processed and accumulated.

The accumulated virtual source trace ($\hat{G}(\hat{A},B,t)$, step 755) is then suitable for further processing and/or use in exploration for subsurface minerals, subsurface monitoring, etc. Of course, it is anticipated that each of the surface (and subsurface) receivers will be processed in turn to create virtual traces therefrom (step 760).

Thus, and with respect to all of the embodiments discussed previously, in the case of a passive source, of special concern is the strength of the source energy signals. Because passive sources have tended to be relatively low in amplitude, there may be some surveys where it is difficult to use the resulting data for purposes of full 3-D imaging (discussed more fully below). In these cases, it might prove to be desirable to add artificial "random" signal source such as two or more buoys that have been placed proximate to each other for that purpose and which are periodically driven together by wave action, thereby producing an impulsive source. Another preferred approach would be to use wave motion to raise a weight or pump up a tank with pressure and then release the energy as an impulsive source. If a large number of these devices were to be situated proximate to the survey, it is expected that the source energy produced thereby could contribute significantly to the quality of the resulting passive survey data. Needless to say, purposefully created ambient noise sources such as these could also prove to be useful in a 1-D survey (e.g., a virtual check shot survey), in a 2-D survey, in a 3-D survey, in a time-lapse survey of any of the foregoing, etc.

Figure 3:
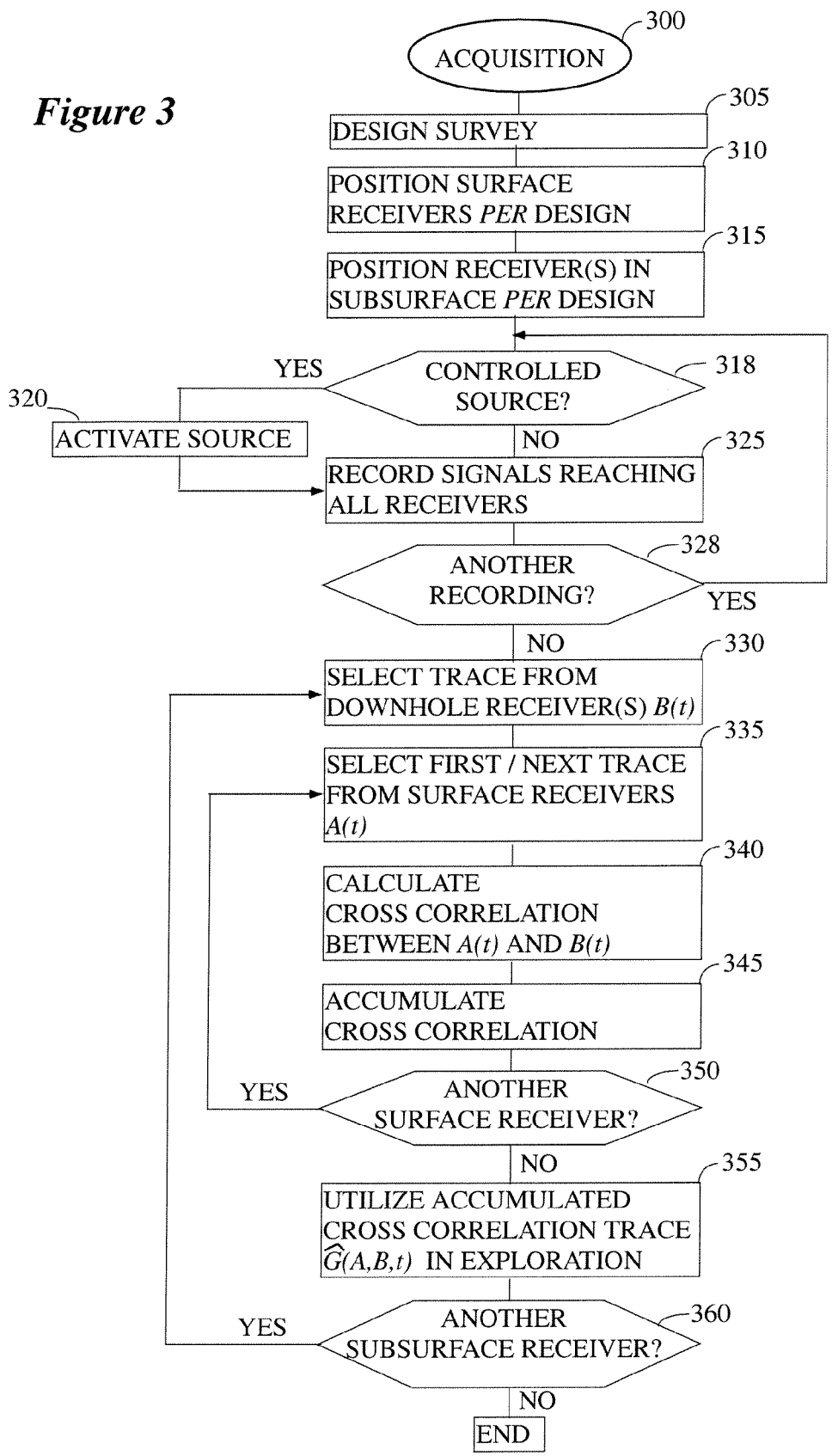
FIG. 3 contains an illustration of a preferred operating logic for use with one embodiment of the instant invention.

Turning now to FIG. 3 wherein some steps in a preferred embodiment 300 are illustrated, as a first preferred step a survey will be designed 305 proximate to a well 210 or other ground penetrating feature. As is typically done in such instances, the locations of the receivers 215 and 225 will preferably be specified. Of course, with respect to the surface/sea bottom receivers 225, the locations will be relative to some natural or arbitrary coordinate system (e.g., latitude and longitude). The in-well receivers 215 are typically positioned as a function of distance from the surface/sea bottom (i.e., depth in the well), although in the case of deviated wells that will also result in some lateral displacement from the surface location of the well bore 210. Methods for determining and accounting for such deviations are well known to those of ordinary skill in the art.

As a next preferred step, receivers 215 and 225 will be positioned in the field at least approximately according to the survey design (steps 310 and 315). Those of ordinary skill in the art will recognize that often the survey plan cannot be followed exactly and it is anticipated that some adjustments may necessarily need to be made in the field.

As a next preferred step, recordings will be made through all of the receivers (step 325). Depending on whether an active (controlled) or passive source is used (decision item 318), the source (e.g., an airgun 205) may or may not need to be activated before recording (step 320). That is, if the source is passive no airgun 205 or other source will be used. In the case of a controlled source, it is possible that multiple activation/recording combinations will be performed (e.g., see the loop indicated by decision item 328). If a passive source is utilized, the receivers will be recorded 325 for some predetermined period of time. Of course, in a passive source survey multiple recording sessions could similarly be utilized to produce multiple traces for each receiver.

In either case, after the data are acquired (step 325), they will typically be moved from the field and back into a processing center where more computer power is available. That being said, those of ordinary skill in the art will recognize that it is certainly possible that some or all of the steps that follow could be performed in the field using computers located, for example, within the boat 200 or on the platform 220.

Next, a trace that has been recorded by one of the downhole receivers, B(t), will preferably be selected (step 330). Note that this trace may have been preprocessed (e.g., by frequency filtering, muting, application of field geometry, etc.) in advance of its selection at the instant step 330. In other variations, such processing might be done after selection of the trace but before subsequent use below according to the instant invention.

As a next preferred step, each of the surface-recorded traces A(t) will be selected in turn (step 335) during the execution of loop 335 through 350. Each selected surface trace A(t) will then preferably be cross correlated (step 340) with B(t), the selected trace from a downhole recording. Note that this operation will produce as many cross correlation traces as there are surface traces A(t), if all of the surface traces are used. Note that in some instances it might be desirable to select another downhole-recorded trace and repeat the previous process (e.g., via test 360 and its associated loop).

Those of ordinary skill in the art will recognize that cross correlation can similarly be characterized as time-reversed convolution. That is, if A(t) is time reversed and then convolved with B(t), the resulting trace will be the same as the cross correlation of A(t) with B(t). Thus, when the term "cross correlation" is used herein, that term should be broadly construed to also include time-reversed convolution.

Although it is certainly preferred that a cross correlation be used to obtain the virtual source records, it should be noted that a cross correlation can also be characterized as a series of vector inner products. As a consequence, when the term "cross correlation" is used herein that term should further understood to include traditional cross correlation calculations as well as vector inner products which yield values that are similar in spirit or concept to those obtained by the more traditional computation.

Next, and preferably in conjunction with the loop 335-350, the traces obtained by cross correlation will be summed together, averaged, or otherwise accumulated (step 345). This accumulation process will preferably continue for each cross correlation trace produced at step 340 so that, when the loop terminates a, single composite trace will be produced. Those of ordinary skill in the art will recognize that, although a summation is preferred, any other measure of central tendency could potentially be utilized. For example, a median stack, trimmed mean stack, geometric mean stack, etc., could be used instead to combine the traces into a single representative trace. All that is required if measure of central tendency is applied is that the resulting trace represents in some sense a composite of the different individual cross correlations that are used to form it. As a consequence, when the terms "summation" or "accumulation" are used here, those terms should be understood to include instances where traditional, as well as non-traditional, measures of central tendency are employed.

As has been discussed previously, the resulting composite trace can be viewed in theory as being the equivalent of a seismic trace that was created by exciting a source at the geographic center of the surface receivers used in forming the summation as recorded by the selected downhole receiver. In effect, a virtual VSP seismic data trace has been produced.

Of course, the previous procedure could certainly be repeated with other downhole receivers to create as many composite traces as there are receivers in the well. Additionally, it might be desirable in some instances to use fewer than the total number of surface traces to form virtual traces.

Further, it should be noted that the step of creating a composite trace is not strictly required, although generally such an operation will tend to increase the signal-to-noise ratio. Thus, in some preferred embodiments each surface trace will be cross correlated with the same downhole receiver to produce as many resulting traces are there are individual surface traces. Further, where there are several downhole receivers, there would be a large number of combinations that could be formed by choosing one surface and one subsurface trace. Still further, a wide variety of composite traces could also be formed by summing together different numbers of cross correlated traces. Thus, when the term "composite trace" is used herein, that usage should be understood to include instances where the composite includes only a single trace, i.e., there has been no summation and each cross correlated trace is used separately.

In any case, at the conclusion of the previous operations, the resulting composite traces will be conceptually analogous to traces that were obtained by activating a source at the center of the receivers so-combined and recording that source at the selected downhole receiver as would be the case with a conventional VSP or checkshot survey.

As a consequence, data that is obtained according to the instant invention may be utilized for any purpose that a conventional VSP trace or checkshot trace might be utilized. For example, after having obtained seismic data traces according to the methods disclosed above, the information contained in the resulting seismic traces could be used to estimate the velocities between the surface and the downhole receivers (e.g., as is typically done in a checkshot survey). Of course, such velocity estimates are useful both as exploration tools in their own right and as input to other seismic processing programs that utilize velocity fields (e.g., migration, NMO, etc.).

Note that in some preferred embodiments the in-well receivers and surface receivers will be permanently (or semi-permanently) installed, thereby making it possible to easily perform multiple surveys according to the instant invention. In such an instance, it will be possible to create time-lapse images. If the receivers yield a 3-D subsurface image, the resulting series of time-lapse 3-D images is known to those of ordinary skill in the art as a 4-D survey. Of course the advantages of collecting 4-D and other time-lapse surveys are well known and, as a specific example, such surveys might be used to estimate compaction or other subsurface changes that can result when hydrocarbons are removed from the subsurface. As another preferred use of this data, a 4-D or other time-lapse survey might be used to continuously monitor the progression of a drill bit in the subsurface, which information can be of special importance if there is a concern that high-pressure gas could potentially be encountered by the bit. Either a passive or an active survey could be used in this case, although higher signal quality would likely be produced by using an active (e.g., an airgun) source. That being said, an in-progress drilling operation generates a fair amount of signal/noise which could be used to advantage in a passive survey.

Note that in the event that a passive source is used, it is anticipated that much of the initial processing would be preferably done at the survey site. This could be for any number of reasons, but for example, it would be preferably to calculate the virtual sources in the field to keep from having to store (for example) a full 30 seconds of data from each receiver multiplied, of course, by the number of recording sessions that have been conducted. Obviously, in the case of a continuous survey, data could possibly be acquired quite frequently and, over a period of several months or years, the data volume could become substantial. As an additional preferred reason for doing at least some initial processing on-site is that the data may very well be most useful to a drilling or production crew on the rig (e.g., if the instant invention were to be used to monitor the progress of a drill bit in the subsurface and/or image the rock units below it).

Figure 5:
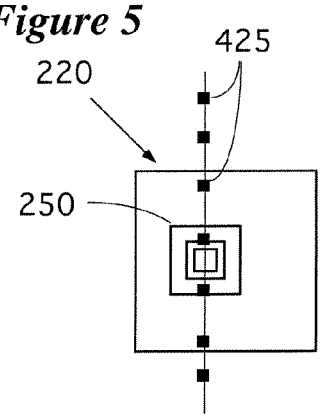
FIG. 5 contains a plan view illustration of the embodiment of FIG. 4.
Figure 6:
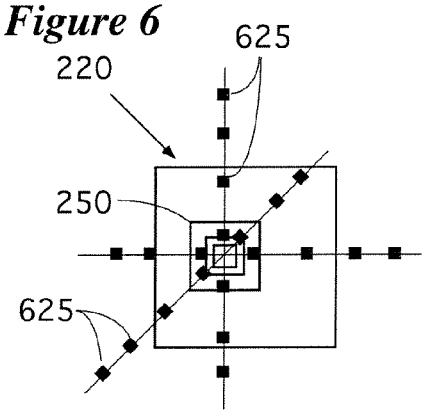
FIG. 6 contains a plan view of an embodiment of the instant invention wherein the surface receivers are arranged in a 2-D pattern.

According to still another preferred embodiment, there is provided a system and method for acquiring seismic data for use in geophysical exploration substantially as described above, but wherein the surface receivers are distributed in a 2-D pattern, preferably on the ocean bottom. That is, in this configuration the surface receivers will be distributed spatially in a pattern that is other than linear. The resulting traces (whether summed or used individually) can then be arranged to form a 3-D data set. FIGS. 5 and 6 illustrate this concept in a general way.

FIG. 5 is a simplified plan-view representation of FIG. 4. The derrick 250 has been identified to assist in visualizing this different perspective. Note that in the embodiment of FIG. 5, the surface receivers 425 have been arranged in a linear pattern underneath the platform 220. Compare FIG. 5 with the arrangement of FIG. 6, wherein the receivers 625 have been distributed in a two-dimensional pattern underneath the platform 220. The resulting cross correlation traces (which potentially could include all possible combinations of surface and subsurface receivers) can be used to form a 3-D image of the subsurface according to methods well known to those of ordinary skill in the art. In this embodiment, the use of "manufactured" random noise (e.g., the buoy system described previously) would be especially useful in those cases where the object is to acquire a 3-D data set. Further, a passive 3-D survey it would benefit from having random source energy arrive from many different directions in order to improve the quality of the virtual sources obtained from these data. In such a case, placing manufactured data sources such at key locations on the surface of the ocean could be made a part of the overall survey design.

Additionally, it should be noted that although the instant invention has been described principally in terms of an offshore embodiment, the instant method is suitable for application on land as well. All that is required is that there be one or more receivers positioned beneath the surface within a well which are recorded simultaneously with other receivers that have been situated above them on the surface—or proximate to it (e.g., in shallow holes). For purposes of the instant disclosure, the term "well" should be broadly understood to mean both traditional wells as well as other subsurface penetrating features.

Note that, although the methods discussed herein have primarily been applied to the location of hydrocarbon deposits in the subsurface, those of ordinary skill in the art will recognize that the instant methods could readily be applied to the location of other subsurface resources (e.g., $CO_2$ deposits, minerals, etc.). As a consequence, when the term "subsurface resource" is used in the claims below, that term should be broadly interpreted to include hydrocarbon deposits as well as non-hydrocarbon deposits.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of geophysical exploration within a predetermined volume of the earth containing subsurface structural and stratigraphic features conducive to the generation, migration, accumulation, or presence of subsurface resources, comprising the steps of:
   a. positioning a plurality of surface seismic receivers on the surface of the earth;
   b. positioning at least one well seismic receiver within a well;
   c. obtaining signals representative of a seismic energy source from said plurality of surface seismic receivers and from said at least one well seismic receiver, thereby obtaining a plurality of surface seismic signals and at least one well seismic signal;
   d. selecting one of said at least one well seismic signal, thereby selecting one of said at least one well seismic receiver;
   e. cross correlating each of said plurality of surface seismic signals with said selected one of said at least one well seismic signal, thereby producing a plurality of virtual source signals;
   f. combining said plurality of virtual source signals to obtain a virtual source seismic signal;
   g. determining at least approximately a surface location corresponding to a minimum time travel path from said selected one of said well seismic receiver to the surface of the earth;
   h. associating said surface location with said virtual source seismic signal; and,
   i. using said virtual source seismic signal and said surface location to explore for subsurface resources within the predetermined volume of the earth.

2. The method according to claim 1, wherein step (a) comprises the step of:
   (a1) positioning a plurality of surface seismic receivers on the surface of the earth, wherein said surface of the earth comprises an ocean bottom.

3. The method according to claim 1, wherein said at least one surface seismic receivers are selected from a group consisting of geophones or hydrophones.

4. The method according to claim 1, wherein the seismic energy source of step (c) is either a controlled seismic energy source or a passive seismic energy source.

5. The method according to claim 1, wherein step (a) comprises the step of;
   (a1) positioning at least three surface seismic receivers on the surface of the earth, wherein said at least three surface seismic receivers are arranged in a 2D configuration.

6. The method according to claim 1, wherein step (c) comprises the step of:
   (c1) obtaining signals representative of a plurality of passive seismic energy sources from each of said plurality of surface seismic receivers and each of said at least one well seismic receivers, wherein said signals representative of a plurality of passive seismic energy sources are obtained by continuously recording signals from said plurality of surface seismic receivers and said at least one well seismic receiver over a period of time of least 30 seconds in duration.

7. The method according to claim 1, wherein step (f) comprises the step of summing together said plurality of virtual source signals to obtain a virtual source seismic signal.

* * * * *